United States Patent
Zhang et al.

(10) Patent No.: US 12,328,341 B2
(45) Date of Patent: Jun. 10, 2025

(54) APPLICATION LAYER CHARACTERIZATION OF ENCRYPTED TRANSPORT PROTOCOL

(71) Applicant: Hughes Network Systems, LLC, Germantown, MD (US)

(72) Inventors: Qianqian Zhang, Rockville, MD (US); Chi-Jiun Su, Rockville, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 155 days.

(21) Appl. No.: 18/317,574

(22) Filed: May 15, 2023

(65) Prior Publication Data

US 2024/0388604 A1    Nov. 21, 2024

(51) Int. Cl.
*H04L 29/06* (2006.01)
*H04L 9/40* (2022.01)

(52) U.S. Cl.
CPC ........ *H04L 63/166* (2013.01); *H04L 63/0227* (2013.01); *H04L 63/0414* (2013.01)

(58) Field of Classification Search
CPC ............. H04L 63/0227; H04L 63/0414; H04L 63/166
See application file for complete search history.

(56) References Cited

U.S. PATENT DOCUMENTS

| | | | |
|---|---|---|---|
| 10,341,241 B2 | 7/2019 | Su et al. | |
| 10,454,804 B2 | 10/2019 | Jain et al. | |
| 10,601,869 B2 | 3/2020 | Joch et al. | |
| 10,958,546 B2 | 3/2021 | Jain et al. | |
| 2018/0145907 A1* | 5/2018 | Vannithamby | ........ H04L 43/091 |
| 2020/0213211 A1 | 7/2020 | Jain et al. | |

(Continued)

OTHER PUBLICATIONS

"Usage statistics of QUIC for websites," accessed: Oct. 2022. [Online]. Downloaded online on May 15, 2023, 2 pages. Available: https://w3techs.com/technologies/details/ce-quic.

(Continued)

*Primary Examiner* — Jeffrey C Pwu
*Assistant Examiner* — Thong P Truong
(74) *Attorney, Agent, or Firm* — Mannava & Kang, P.C.

(57) ABSTRACT

Systems and methods for providing application-layer characterization is disclosed. Quick User Datagram Protocol (UDP) Internet Connection (QUIC) is an end-to-end encrypted, transport-layer protocol, with a goal to improve communication security and quality of experience (QoE) towards end-users. The systems and methods disclosed herein relate to estimating application-level traffic attributes without decrypting QUIC packets. Based on size, timing, and direction information available in the encrypted packet, the system analyzes associated network traffic to infer an identity of each request and response pair, including time, size, and request-response match, as well as multiplexing feature in each QUIC connection. In the case of request and response multiplexing, several requests will be gathered and matched as a group with their corresponding responses, to form a super request-response pair. The inferred attributes may be used to evaluate the QoE of application-layer services and identify the service categories for traffic classification in the encrypted QUIC connections.

20 Claims, 9 Drawing Sheets

(56) References Cited

U.S. PATENT DOCUMENTS

2020/0322243 A1    10/2020    Xi et al.
2021/0092036 A1    3/2021    Jain et al.

OTHER PUBLICATIONS

A. Bentaleb et al., "Inferring quality of experience for adaptive video streaming over HTTPS and QUIC," in Proceedings ofthe IEEE International Wireless Communications and Mobile Computing (IWCMC), 2020, pp. 81-87.

A. Langley et al., "The QUIC transport protocol: Design and Internet-scale deployment," in Proceedings of the conference of the ACM special interest group on data communication, 2017, pp. 183-196.

B. Anderson et al., "Limitless HTTP in an HTTPS world: Inferring the semantics of the HTTPS protocol without decryption," in Proceedings of the Ninth ACM Conference on Data and Application Security and Privacy, 2019, pp. 267-278.

F. Bronzino et al., "Inferring streaming video quality from encrypted traffic: Practical models and deployment experience," in Proceedings of the ACM on Measurement and Analysis of Computing Systems, vol. 3, No. 3. ACM New York, NY, USA, 2019, pp. 1-25.

I. Akbari et al., "A look behind the curtain: traffic classification in an increasingly encrypted web," in Proceedings of the ACM on Measurement and Analysis of Computing Systems, vol. 5, No. 1. ACM New York, NY, USA, 2021, pp. 1-26.

J. Border et al., "Evaluating QUIC's performance against performance enhancing proxy over satellite link," in Proceedings of the IEEE IFIP Networking Conference, 2020, pp. 755-760.

J. Iyengar et al., "QUIC: A UDP-based multiplexed and secure transport," Internet Engineering Task Force, Internet-Draft draftietf-quic-transport-27, 2020.https://www.rfc-editor.org/rfc/rfc9000.html.

M. H. Mazhar et al., "Real-time video quality of experience monitoring for HTTPS and QUIC," in Proceedings of the IEEE Conference on Computer Communications (INFOCOM), 2018, pp. 1331-1339.

M. Kuehlewind et al. "Manageability of the QUIC transport protocol," Internet Engineering Task Force, Internet-Draft draft-ietfquicmanageability-06, 2020.https://www.rfc-editor.org/rfc/rfc9312.html.

P. Zhan et al., "Website fingerprinting on early QUIC traffic," Computer Networks, vol. 200, p. 108538, 2021.

S. Xu et al., "CSI: Inferring mobile ABR video adaptation behavior under HTTPS and QUIC," in Proceedings of the Fifteenth European Conference on Computer Systems, 2020, pp. 1-16. [4] "Usage statistics of QUIC for websites," accessed: Oct. 2022. [Online]. Available: https://w3techs.com/technologies/details/ce-quic.

T. Mangla et al., "Using session modeling to estimate HTTP-based video QoE metrics from encrypted network traffic," IEEE Transactions on Network and Service Management, vol. 16, No. 3, pp. 1086-1099, 2019.

V. Tong et al., "A novel QUIC traffic classifier based on convolutional neural networks," in Proceedings of the IEEE Global Communications Conference (GLOBECOM), 2018, pp. 1-6.

"The International Search Report and Written Opinion for Application No. PCT/US2024/019163", dated Jun. 21, 2024, 16 pages.

Qianqian Zhang et al., "Application-layer Characterization and Traffic Analysis for Encrypted QUIC Transport Protocol", Oct. 10, 2023, 9 pages.(https://arxiv.org/pdf/2310.10676).

\* cited by examiner

APPLICATION LAYER CHARACTERIZATION OF ENCRYPTED TRANSPORT PROTOCOL

BACKGROUND

Passive monitoring over the network traffic is essential for Internet Service Providers (ISPs) and network operators to perform a wide range of network operations and management activities. Given the monitored network status, ISPs can adjust the capacity planning and resource allocation so as to guarantee a good quality of service (QOS). Network monitoring also facilitates intrusion detection and expedites troubleshooting for the network administrators to ensure a stable service connectivity for the customers. Due to the lack of access to user applications, devices, or servers, passive monitoring may be challenging for network operators, which can only rely on the network traffic to infer the application-layer quality of experience (QoE). Furthermore, as concerns pertaining to privacy violations continually grow, popular applications have begun to adopt encryption protocols. For example, most prominent web-based services apply hypertext transfer protocol secure (HTTPS) to protect the security for bi-directional communications between the Internet users and servers. Consequently, encryption on the one hand protects users' data and privacy, but also disables the current network management mechanisms for QoE monitoring and optimization.

Among all current efforts to incorporate encryption, a transport-layer protocol, called Quick User Datagram Protocol (UDP) Internet Connection (QUIC), has emerged to improve communication security and QoE for end-users. QUIC is a UDP-based, reliable, multiplexed, and fully-encrypted protocol, where encryption prevents modification and limits ossification of the protocol over the packet delivery path, and the use of UDP allows QUIC packets to traverse middle boxes. Compared with Transmission Control Protocol (TCP), QUIC uses a cryptographic handshake that minimizes handshake latency, and eliminates head-of-line blocking delays by using a lightweight data structure called streams, so that QUIC can multiplex multiple requests/responses over a single connection by providing each with its own stream identifier (ID), and therefore loss of a single packet blocks only streams with data in that packet, but not others in the same QUIC connection. QUIC is expected to grow in the mobile 5G/6G networks and satellite communication systems.

However, compared with other encryption technologies, QUIC may bring proven challenging for passive traffic monitoring and performance estimation. For example, TCP header provides useful information, including flags and sequence number, which enables ISPs to inspect the TCP communication status. However, the encryption applied to the QUIC headers may leave very limited information for ISPs to identify the QUIC connection states. Meanwhile, multiplexing and concurrency of HTTP requests and responses over multiple streams in QUIC add complexity to passively evaluate the application performance and user's QoE. Furthermore, in the satellite-based network systems, TCP traffic is usually optimized with Performance Enhancing Proxies (PEPs). However, QUIC's end-to-end encryption disables PEP optimizations, which may result in an under-performance, compared with TCP PEP, even with QUIC's fast handshake.

The existing approaches may only support the TCP protocol, which cannot be easily extended to QUIC, due to the limited information in the QUIC transport header. Further, existing approaches may have limitations in terms of QUIC traffic analysis for the application-layer attributes.

Therefore, there may be a need to provide systems and methods to mitigate the problems associated with the existing approaches.

Figure 1:
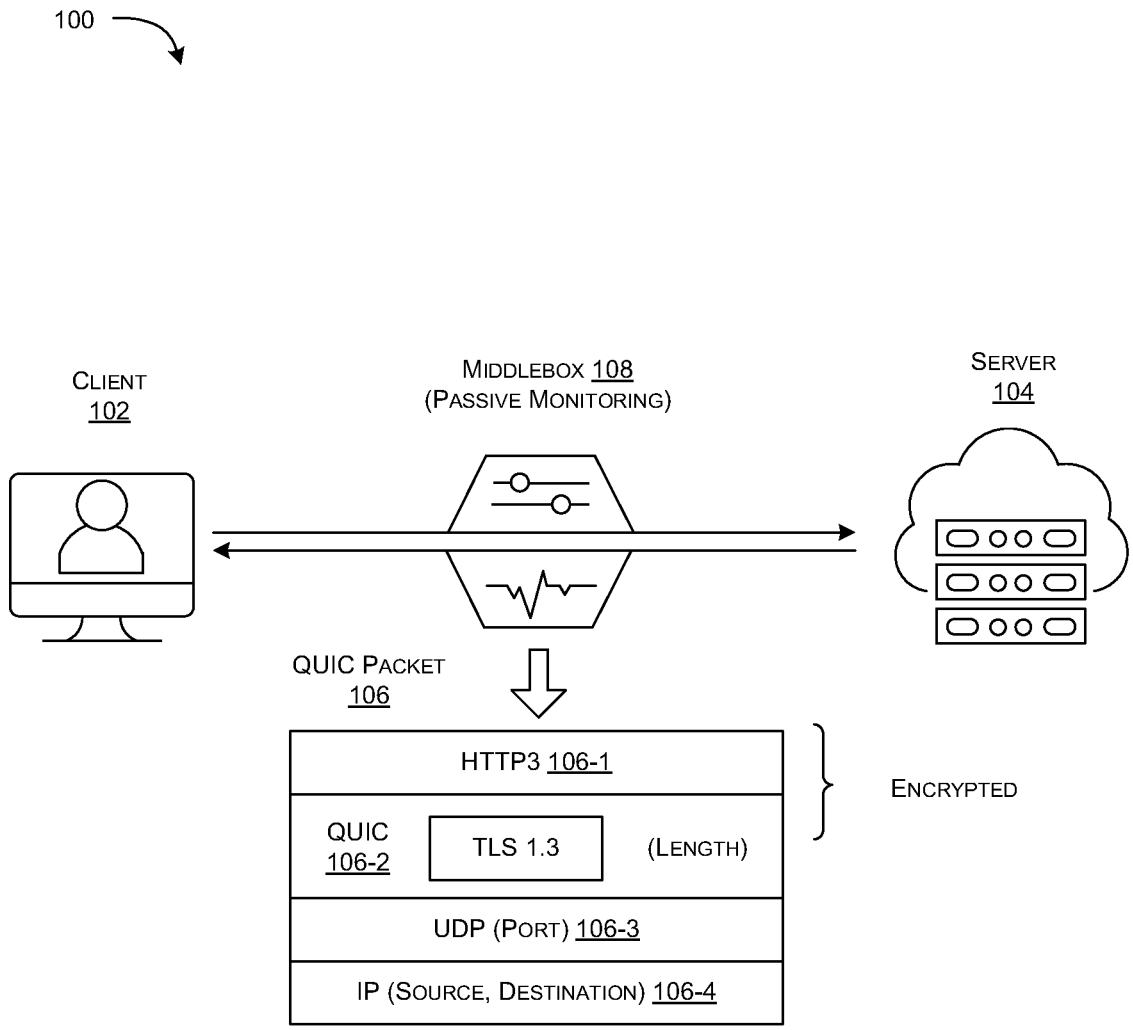
FIG. 1 illustrates an operating environment or a network architecture for implementing application-layer characterization method.

The foregoing shall be more apparent from the following more detailed description of the disclosure.

DETAILED DESCRIPTION

In the following description, for the purposes of explanation, various specific details are set forth in order to provide a thorough understanding of examples of the present disclosure. It will be apparent, however, that examples of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides examples only, and is not intended to limit the scope, applicability, or configuration of the disclosure. Rather, the ensuing description of the examples will provide those skilled in the art with an enabling description for implementing an exemplary example. It should be understood that various changes may be made in the function and arrangement of elements without departing from the spirit and scope of the examples as set forth.

Specific details are given in the following description to provide a thorough understanding of the examples. However, it will be understood by one of ordinary skill in the art that the examples may be practiced without these specific details. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Also, it is noted that individual examples may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one example" or "an example" or "an instance" or "one instance" means that a particular feature, structure, or characteristic described in connection with the example is included in at least one example of the present disclosure. Thus, the appearances of the phrases "in one example" or "in an example" in various places throughout this specification are not necessarily all referring to the same example. Furthermore, the particular features, structures, or characteristics may be combined in any suitable manner in one or more examples.

The terminology used herein is for the purpose of describing particular examples only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Systems and methods described herein provide a solution, in the form of a rule-based approach to determine application-level traffic attributes without using any decryption towards Quick User Datagram Protocol (UDP) Internet Connection (QUIC) header or payloads. Specifically, the systems and methods described herein relate to analyzing associated network traffic to infer an identity of each hypertext transfer protocol (HTTP) request and response pair including its time and size information, request-response association, and multiplexing feature in each QUIC connection based on size, timing, and direction information visible in encrypted packets in the QUIC connection. The disclosed system may infer the packets corresponding to client requests, identify server's responses, and then pair each request with its associated response, given network-dependent constraints of inter-packet time and round trip time (RTT). In an example, if HTTP multiplexing is detected, several requests may be matched as a group with their corresponding responses to form a super HTTP request-response pair.

In an example, the systems and methods disclosed herein support both online and offline estimations for HTTP request-response pairs over QUIC protocol. In case of online estimations, real-time traffic may be processed by a three-module state machine to determine an instant status of the HTTP request-response communication. For online estimations, each individual QUIC packet observed at a middlebox may be processed, and instant input features may be obtained from each QUIC packet. Therefore, the systems and methods disclosed herein may support a real-time estimation and minimize the usage of memory at the middlebox. This is explained in detail with reference to FIGS. 1-10 herein. Further, in case of offline estimations, all QUIC packets may be considered at the end of the QUIC connection, where the request and response packets may first be processed individually to generate client's requests and server's responses, and then, a matching algorithm may pair each request and its corresponding response.

In an example, the systems and methods disclosed herein may identify QUIC control messages and HTTP request-response data packets. In order to avoid overestimation of HTTP request/response size, a dynamic threshold on the QUIC packet length may be configured, such that acknowledgement packets, setting packets, and control information of HTTP traffic may be filtered out when estimating the HTTP request/response data objects.

In another example, the disclosed systems and methods herein may handle multiplexing and 0-RTT requests. For example, the attributes of multiplexed streams may be captured to form a super request-response object. Further, the disclosed approach also supports 0-RTT session resumption in QUIC, so that no HTTP request in the 0-RTT packets may be missed out. The inferred HTTP attributes may be further used to evaluate quality of experience (QoE) for application-layer service and identify traffic categories.

The systems and methods disclosed herein may be applied to different applications including, but not limited to, video traffic, interactive website traffic such as user login authentication, and bulk traffic for file upload and download. To this effect, the systems and methods disclosed herein may comprehensively analyze a large amount of QUIC traffic collected over different networks, and summarize a key pattern for HTTP request and response communications over QUIC protocol. By carefully choosing the time and size features which may be visible in encrypted QUIC packets, the systems and methods disclosed herein may estimate the attributes of HTTP request and response from HTTP object level, QUIC connection level, and application layer service level.

Further, the systems and methods disclosed herein may be applied under various network conditions, given different maximum transfer size (MTU) and RTT. In an example, the systems and methods disclosed herein may automatically detect values of the MTU and the RTT and adjust for a new setting while estimating application-layer characterization. In an example, the systems and methods disclosed herein may be applied in a good network condition, as well as a congested network condition. For example, when a network congestion may be detected, the systems and methods disclosed herein may automatically adjust a threshold of a packet length for an HTTP data packet, and filter control packet in the estimation result.

Various examples of systems and methods for estimating application-layer characterization will be explained in conjunction with FIGS. 1-10.

FIG. 1 illustrates an example operating environment or a network architecture 100 for implementing application-layer characterization method. In particular, FIG. 1 illustrates an example of a high-level block diagram of a network architecture 100 that supports transferring data between endpoints via transport protocol connections established according to one or more connection-oriented transport protocols. In an example, the disclosed approach may be applied with QUIC, a transport protocol that establishes streams between endpoints over UDP and uses sequence numbers and acknowledgements for reliable sequenced data delivery.

As shown in FIG. 1, one or more connections, according to a connection-oriented transport protocol, may be established for transferring data between a client endpoint 102 and a server endpoint 104 in a network. In a given connection, request packets including data transmitted by the client endpoint 102 may be transferred in a forward direction from the client endpoint 102 to the server endpoint 104, and response packets including data transmitted by the server endpoint 104 may be transferred in a reverse direction from the server endpoint 104 to the client endpoint 102.

Examples of the client endpoint 102 may include, but are not limited to, smartphones, tablet computers, desktop computers, notebook computers, server computers, game consoles, network-connected multimedia devices, Internet of Things (IoT) types of devices, or programs executing on such devices. Although only one client endpoint 102 is illustrated in FIG. 1, it is understood that there may be multiple client endpoints.

Examples of the server endpoint 104 may include, but are not limited to, a server computer, a system comprising multiple server computers, or programs executing on such devices. Although only one server endpoint 104 is illustrated in FIG. 1, it is understood that there may be many additional server endpoints that client endpoint 102, or other client endpoints, may communicate with.

Referring to FIG. 1, the network architecture 100 may include a middlebox 108 on a path between the client endpoint 102 and the server endpoint 104 to passively monitor bi-directional packets 106 to infer application-layer attributes. In an example, the bi-directional packets 106 may be QUIC packets. In an example, the disclosed system may be implemented as a passive monitoring module or middlebox 108. The middlebox 108 may be able to perceive complete bi-directional traffic without any omission. For example, to observe traffic of a user, the middlebox 108 may be placed at the user's network access point, while to observer the traffic for a cluster of clients, the middlebox 108 may be placed at a network gateway. In effect, the middlebox 108 may passively monitor the bi-directional QUIC packets 106, and rely on discriminative traffic attributes that remain available in the encrypted QUIC packets to infer the application-layer attributes.

Referring to FIG. 1, the QUIC packet 106 may include encrypted information such as HTTP3 106-1 and QUIC packet 106-2 as well as non-encrypted information such as UDP 106-3 and internet protocol (IP) address 106-4. Useful information in the encrypted QUIC packets 106 mainly comes from network layer and transport layer, including source and destination IP addresses 106-4, source and destination port numbers 106-3, and packet length and limited header information 106-2 that may be visible in the encrypted QUIC packet 106. Further, packet arrival time and packet position in a sequence of a QUIC flow may also provide essential information for application-layer characterization.

In an example, in order to support a real-time estimation and minimize usage of memory at the middlebox 108, input features may require only the information of individual QUIC packets. Therefore, window-based feature may not be required, such as average data rate over a time window of five seconds, and the disclosed approach may not depend on large-scale statistical results either, thereby requiring limited calculation power and memory usage. In an example, the window-based feature may be calculated in post-processing stage using real-time estimation results.

In an example, the middlebox 108 may be implemented by way of a single device or a combination of multiple devices that may be operatively connected or networked together. It may be appreciated that the described components/modules/engines may be implemented via a processor (not shown). The middlebox 108 may be implemented in a hardware or a suitable combination of hardware and software. In an example, the middlebox 108 may be a hardware device including the processor executing machine-readable program instructions to perform one or more operations related to evaluation. Execution of the machine-readable program instructions by the processor may enable the proposed middlebox 108 to perform one or more functions. The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor may include, for example, microprocessors, microcomputers, microcontrollers, digital signal processors, central processing units, state machines, logic circuits, and/or any devices that manipulate data or signals based on operational instructions. Among other capabilities, the processor may fetch and execute computer-readable instructions from a memory (not shown) operationally coupled with middlebox 108 for performing tasks such as data processing, input/output processing, attributes extraction, and/or any other functions. Any reference to a task in the present disclosure may refer to an operation being, or that may be, performed on data or input information.

Although FIG. 1 shows exemplary components of the network architecture 100, in other examples, the network architecture 100 may include fewer components, different components, differently arranged components, or additional functional components than depicted in FIG. 1. Additionally, or alternatively, one or more components of the network architecture 100 may perform functions described as being performed by one or more other components of the network architecture 100.

Figure 2:
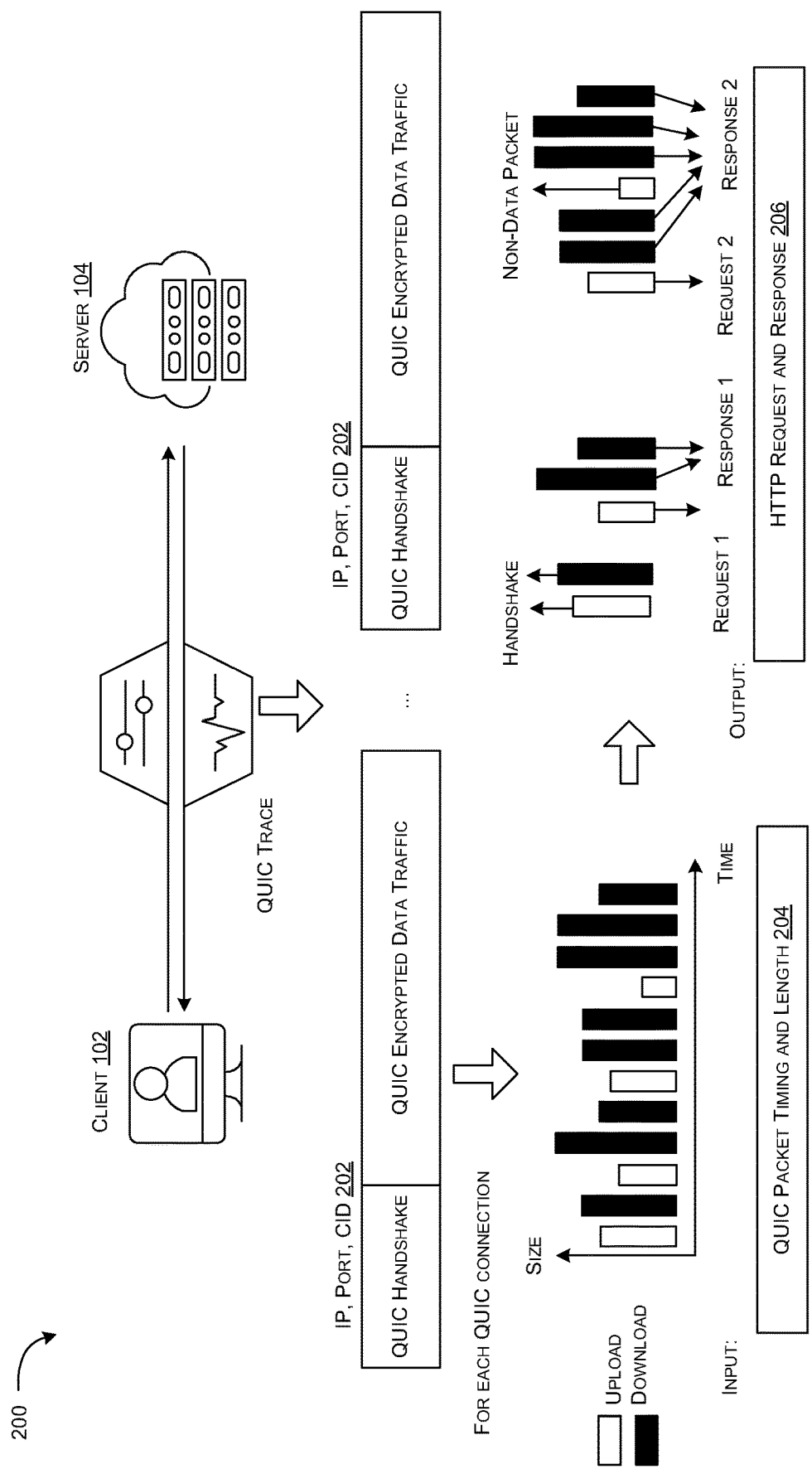
FIG. 2 illustrates an example detailed representation of a network architecture for implementing the proposed system for application-layer characterization.

FIG. 2 illustrates an example representation of a network architecture 200 for implementing the proposed system for application-layer characterization.

Referring to FIG. 2, the observed network trace may be separated into individual QUIC connections 202, and network and transport layer information available in encrypted QUIC packet will be pre-processed to form the input 204 such as, but not limited to, QUIC packet timing and length, while estimated HTTP request and response information 206 composes the output.

In an example, the proposed system, i.e. the middlebox 108 may process the data into individual QUIC connections 202 identified by six-tuples including source IP, destination IP, source port, destination port, protocol, and QUIC connection identifier (ID). Within each connection 202, a sequence of bi-directional QUIC packets with their timing and length information may be observed, and a network operator may extract a small set of features from the network and transport layer headers as the input for application-layer characterization. In an example, the proposed system may compute every feature separately for upstream and downstream traffic.

In an example, the disclosed system may obtain information corresponding to each QUIC packet transferred between the client endpoint 102 and the server endpoint. Further, the system may determine the set of features from each QUIC packet within the QUIC connection based on the obtained information. In an example, the set of features may include, but not be limited to, a QUIC header type, a QUIC packet length, a packet arrival time, and a packet order and position, each of them described herein below.

Figure 3:
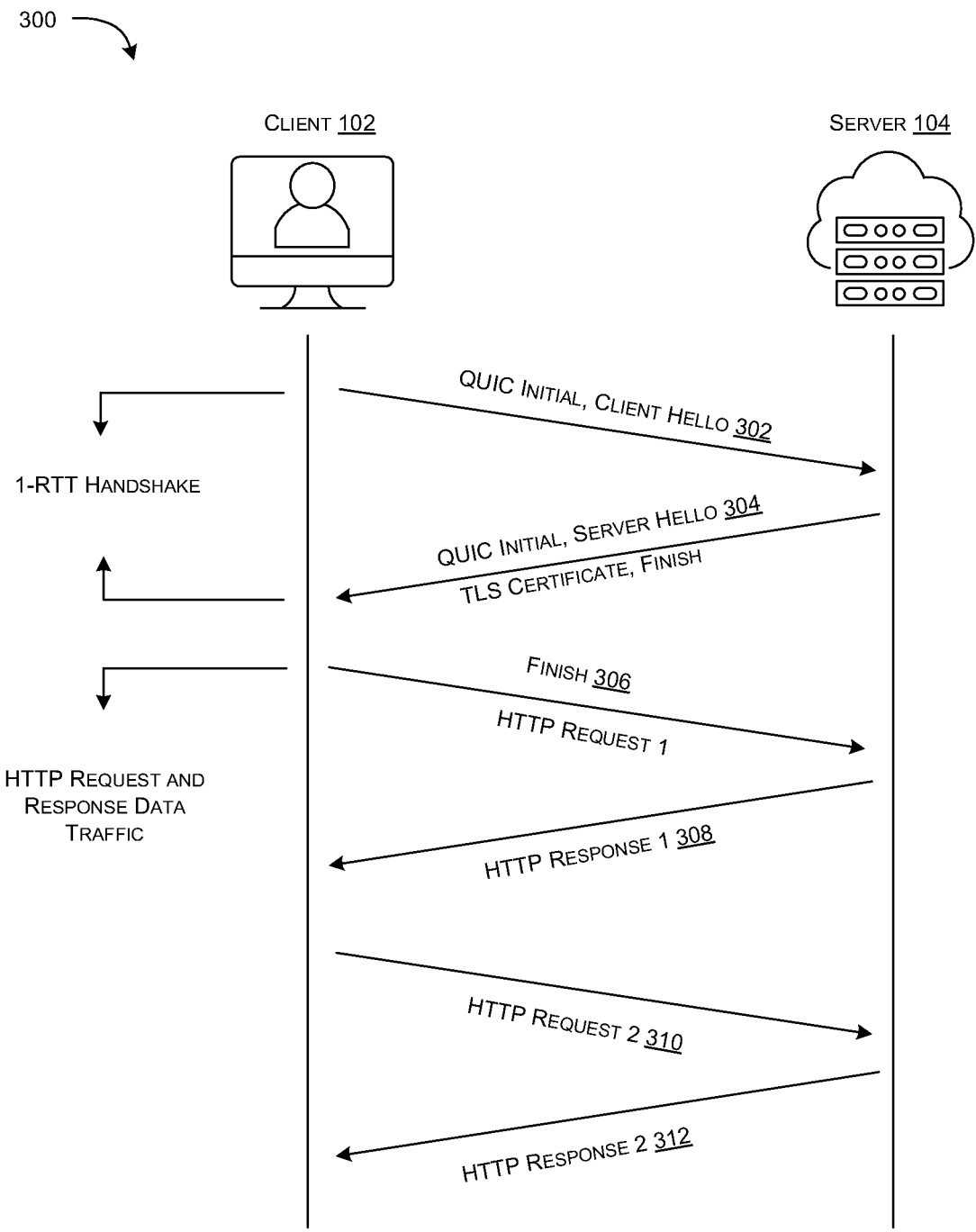
FIG. 3 illustrates an example signal flow for 1-round trip time (RTT) handshake and hypertext transfer protocol (HTTP) request and response data transmission.

In an example, one of the set of features may include a QUIC header type. A QUIC packet (such as 106) may have a long or a short header. The most significant bit of a QUIC packet is the header form bit, which is set to 1 for long headers, and 0 for short headers. This header type is always available in the encrypted QUIC packets and stays invariant across QUIC versions. The long header of QUIC is used in the handshake stage to expose necessary information for version negotiation and establishment of 1-RTT keys between two ends. The short header is a minimal version-specific header, which may be used only after connection establishment. As shown in FIG. 3, the header type provides key information on whether handshake is finished or not. Except for 0-RTT resumption, most of the HTTP requests and responses may occur only after the handshake is finished. Once a QUIC packet with short header is observed in a QUIC connection, it may be observed that the HTTP request and response packets may arrive soon.

In an example, another one of the set of features may include QUIC packet length. Including both header and payload, the overall length of a QUIC packet is always available in the encrypted communications. The packet size may provide key information for a passive-monitoring middlebox (such as 108) to infer whether a QUIC packet contains the HTTP data or non-data (control) information. The packet length may denote the overall size of a QUIC packet in bytes.

In order to pass information with an HTTP request or response, a stream may be implicitly created by using stream frames in the QUIC payload, and each stream within a QUIC connection may be identified by a numeric value, called the stream ID. In an example, the least significant bit of the stream ID may identify the initiator of the stream, where client-initiated streams have even-numbered stream IDs (with the bit set to 0), and server-initiated streams have odd-numbered stream IDs (with the bit set to 1), and the second least significant bit of the stream ID may distinguish between bidirectional streams (with the bit set to 0) and unidirectional streams (with the bit set to 1). Therefore, the two least significant bits from a stream ID identify a stream as one of four types: (0x00) is client-initiated bidirectional stream, (0x01) is server-Initiated bidirectional stream, (0x02) is client-initiated unidirectional stream, and (0x03) is server-initiated unidirectional stream. In an example, HTTP request or response may always use (0x00) client-initiated bidirectional stream for data transmission, and vice versa. Meanwhile, the corresponding response will be transmitted over the stream with the same ID as its request. It may be understood that the client-initiated bidirectional stream may be referred as data stream, which may have a stream ID that is a multiple of four in decimal, i.e., 0, 4, 8, 12, etc. Although the stream ID may provide accurate information to identify HTTP request and response, this information in the QUIC frame is fully encrypted and invisible at the middlebox 108. Therefore, in order to distinguish the QUIC packet with data stream frames from the non-data (control) packet, the middlebox 108 may consider the packet length as one of the set of features.

In an example, after the handshake stage, a QUIC packet with HTTP data may have a larger length, compared with non-data (control) packets. For example, acknowledgment (ACK) is a common type of QUIC frame which may have a much shorter size. Thus, by setting a proper threshold to the QUIC packet length, the middlebox 108 may filter out non-data (control) QUIC packets. For example, considering a QUIC packet from the server endpoint 104 to the client endpoint 102, if the packet length is smaller than the threshold $L_{response} \in Z+$, then this packet may not be an HTTP response packet, and the middlebox 108 may exclude this packet from the set of features for estimating application-layer attributes. In an example, inside the payload of one UDP packet, there may be one or multiple QUIC packets. In such a scenario, the middlebox 108 may consider the length of the QUIC packet, instead of the UDP packet, for more accurate information of packet length.

In an example, another one of the set of features may include packet arrival time. Given the arrival time of individual packets, the middlebox 108 may calculate a time difference or inter-arrival time of any two packets in the same QUIC connection.

An HTTP response may consist of multiple response packets. When two sequential packets are transmitted from the server endpoint 104 to the client endpoint 102, the middlebox 108 may determine whether they belong to the same response or not. For this, the middlebox 108 may configure a threshold for the inter-arrival time of the packets. For example, if the inter-arrival time of two response packets is greater than a threshold $\Delta T_{response}$, then these two packets may not belong to the same HTTP response, and may be associated with two different responses. In an example, a common value for the inter-arrival time threshold may be $\Delta T_{response}=1$ RTT. A similar threshold $\Delta T_{request}$ may be applied to consolidate or separate request packets, with a common value $\Delta T_{request}=1$ RTT.

Further, given a detected request and an estimated response, the middlebox 108 may determine whether they are associated to the same HTTP request-response pair. For such determination, the middlebox 108 provides that the time difference between the first packet of the response and the first packet of the request must be greater than or equal to one RTT, and smaller than or equal to $N_{timeout}$ times of RTTs. An example value for $N_{timeout}$ is $N_{timeout}=20$. If this requirement is not satisfied, i.e., the response-request time difference is smaller than one RTT or larger than $N_{timeout}$ RTTs, then the middlebox 108 may determine that this request and this response may not be an associated HTTP pair, and they may belong to different HTTP request-response pairs.

Furthermore, if the QUIC connection has been quiet for very long time, such as no packet is transmitted in any direction for more than 20 RTTs, then the QUIC connection may be in an idle state. In the idle state, before any new request is observed, all response packets from the server endpoint 104 to the client endpoint 102 may be ignored.

Therefore, packet arrival time may provide essential information to consolidate individual packets into request-response pairs, match HTTP requests with their corresponding responses, and check whether a QUIC connection is active or not.

In an example, another one of the set of features may include packet order and length. The order and position of a packet may be determined by its arrival time, as shown in FIG. 2. In an example, the position or order of the packet in the sequence of data flow may provide guidelines for the middlebox 108 to form HTTP request-response pairs. Further, the position information may also help the middlebox 108 to distinguish non-data (control) packets from HTTP data packets, even though the non-data (control) packets may have a long length just like a common data-stream frame. It may be understood that the type of a QUIC frame is encrypted in the QUIC packet payload, and may not be visible to the middlebox 108.

In an example, QUIC traffic may display a noticeable pattern in both HTTP response and request transmissions. Therefore, when the middlebox 108 observes a sequence of QUIC packets with special length and noticeable order values, the middlebox 108 may separate these packets into several groups, each of which forms an HTTP request or response. For example, an HTTP response may consist of multiple QUIC packets. In an example, the first response packet may have a length that is slightly smaller than MTU size; then, the response may be followed with a sequence of multiple MTU-sized packets; finally, the response may end with a packet with much smaller size than MTU. The small length of the first response packet may be caused by the combination of control frame and data frame into one UDP payload, while the smaller size of the last packet may contain the left-over response content in this response transmission which may usually be much less than one MTU. Given this observation, the middlebox 108 may consolidate responses from a sequence of individual response packets, together with the requirement of inter-arrival time threshold. A similar pattern may be observed in the HTTP request as well. However, different from response, most of HTTP requests may have very limited content, such as GET method, whose size may be less than the limit of a single data frame. In this case, most of the HTTP requests may consist of a single packet with length smaller than MTU but greater than the request threshold $L_{request} \in Z+$.

In an example, the position information may reveal whether a QUIC packet with a large size contains a data frame or not. For example, cryptographic (CRYPTO) frame may be used to exchange keys for encrypting in-order stream of bytes. Due to the large size of cryptographic content, a QUIC packet with CRYPTO frame may have as long length as data-stream frame. In order to distinguish the CRYPTO and data packets, the middlebox 108 may rely on the position of the considered packet, because CRYPTO packet only exists during or right after handshake stage, while HTTP response may appear after at least one request which may be explicitly later than handshake. A similar rule may apply to the Handshake Done and New Token (NT) frames, which indicate the end of the handshake but the packet may have a short header and a large size, thus, these packets may be easily mis-classified as an HTTP response if the position information is ignored.

In an example, Table 1 lists the set of features explained above with their underlying purposes.

TABLE 1

| Input Features | Purposes |
| --- | --- |
| Packet direction | Separate request and response packets. |
| QUIC header type | Check whether the handshake is finished. |
| QUIC packet length | Check whether a QUIC packet contains HTTP request or response data. |
| Packet arrival time | Check whether two packets belong to the same object, whether an HTTP request is associated with a response, and whether a QUIC connection is still active. |
| Packet order and position | Build HTTP request-response pairs from a sequence of individual QUIC packets, and filter out large-sized non-data packets. |

Although FIG. 2 shows exemplary components of the network architecture 200, in other examples, the network architecture 200 may include fewer components, different components, differently arranged components, or additional functional components than depicted in FIG. 2. Additionally, or alternatively, one or more components of the network architecture 200 may perform functions described as being performed by one or more other components of the network architecture 200.

FIG. 3 illustrates an example signal flow 300 for 1-RTT handshake and HTTP request and response data transmission.

Referring to FIG. 3, at steps 302 and 304, the client endpoint 102 and the server endpoint 104 complete 1-RTT handshake. Further, at steps 306 to 312, the client endpoint 102 and the server endpoint 104 perform HTTP request and response data transmission. In particular, at step 306, the client endpoint 102 transfers a first HTTP request to the server endpoint 104. At step 308, the server endpoint 104 transfers a first HTTP response to the client endpoint 102. Further, at step 310, the client endpoint 102 transfers a second HTTP request to the server endpoint 104, and at step 312, the server endpoint 104 transfers a second HTTP response to the client endpoint 102.

Figure 4:
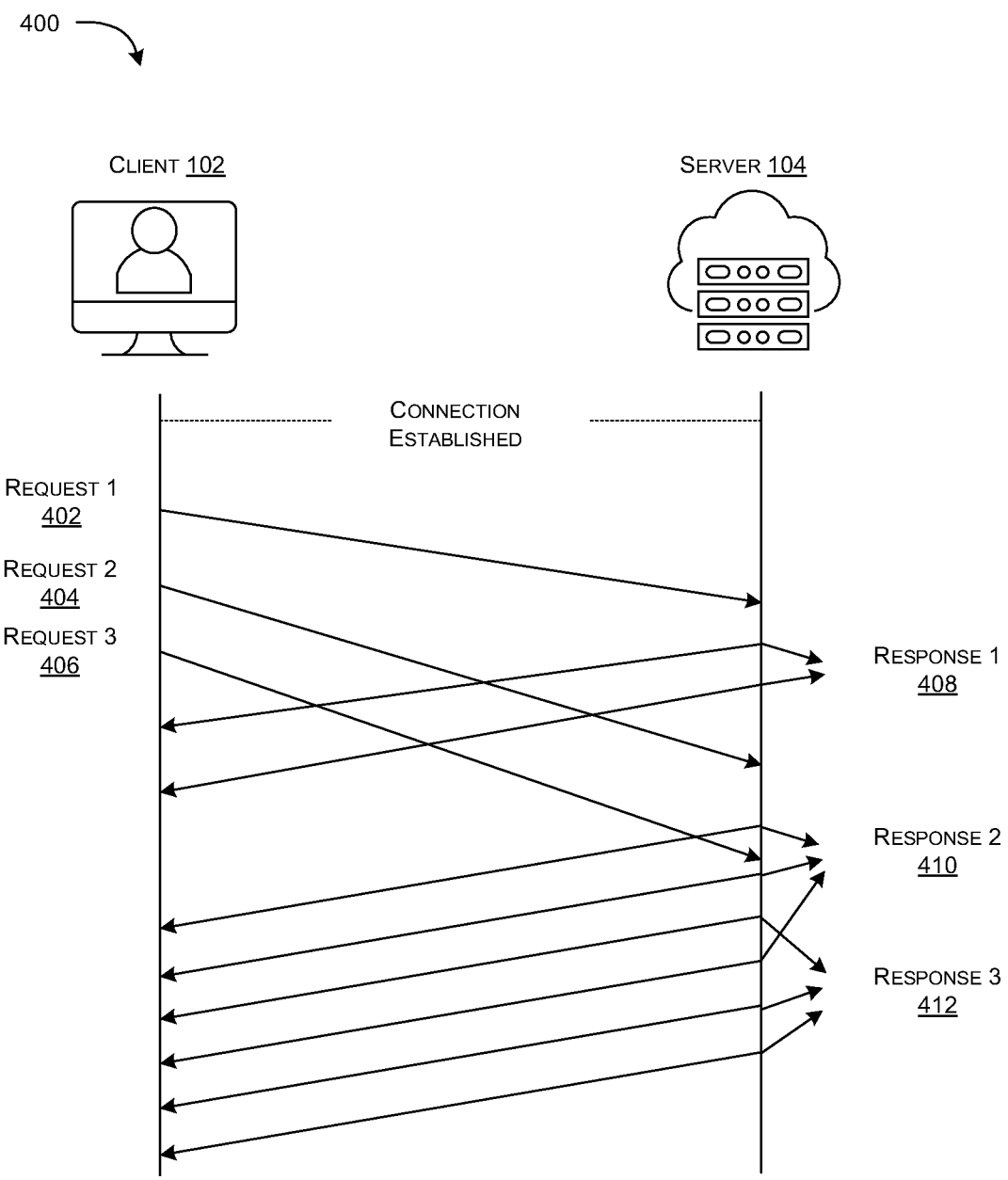
FIG. 4 illustrates an example signal flow for HTTP request and
response multiplexing.

FIG. 4 illustrates an example signal flow 400 for HTTP request and response multiplexing.

Referring to FIG. 4, once a connection is established between the client endpoint 102 and the server endpoint 104, the client endpoint 102 may send first, second, and third requests at steps 402, 404, and 406, respectively, and receive respective first, second, and third responses at steps 408, 410, and 412 by way of multiplexing. In an example, because the client 102 may send multiple requests in steps 402, 404, and 406 at very close timestamps, their corresponding response packets in steps 408, 410, and 412 may be interleaved with each other as shown in the FIG. 4's timeline.

Given the set of features determined from the HTTP request and response packets, the middlebox 108 may analyze the associated network traffic, and generate a set of attributes, i.e. output attributes. In an example, the set of attributes may include, but not limited to, object-level attributes, connection-level attributes, and application-level attributes. The object-level attributes may include attributes of HTTP request-response communication pairs, and the connection-level attributes may summarize the status of all data transmission over the QUIC connection. Although the HTTP request/response information is encrypted in the QUIC traffic, the disclosed system, i.e. the middlebox 108 may assess both object-level and connection-level characterizations by passively monitoring the packet sequence.

In an example, one of the set of attributes may include HTTP request-response object information. An HTTP pair may consist of an HTTP request and its corresponding HTTP response. For the request part, the middlebox 108 may output the start time, size, and the number of request packets in the considered HTTP request. On the response side, the output attributes may include the start time, end time, size, and the number of response packets in the HTTP response. In an example, the request end time may be excluded in the output attribute because most of HTTP requests may consist of a single packet, and therefore, the start time and end time of a request may coincide.

In an example, QUIC protocol may support HTTP request and response multiplexing, by creating multiple streams in the same connection. That is, before the transmission of an existing HTTP response is finished, another request may be sent from the client endpoint 102 to the server endpoint 104 over a new stream. As shown in FIG. 4, before the client endpoint 102 may receive a first response at step 408, second and third requests may have been sent out at steps 404 and 406, respectively. In the case of multiplexing, the sequence of request or response packets belonging to different HTTP objects may be interleaved with each other, and it may be difficult to separate the request or response packets for each individual HTTP object, based on their length and timing information only. Referring to FIG. 4, the transmission of second and third HTTP responses at steps 410 and 412 may be mixed together. Therefore, to deal with HTTP multiplexing in a QUIC connection, the middlebox 108 may group the interleaved HTTP request-response objects together to form a super request-response object. In this case, the estimated object-level attributes may include the request (or response) start time which may be the time stamp of the first request (or response) packet in the super object, the response end time which may be the time stamp of the last response packet, the request (or response) size which may be the total size of all request (or response) packets in the super object, and the request (or response) packet number which may be the total number of all request (or response) packets in the super object. Further, the number of HTTP pairs may denote how many individual request-response pairs are grouped together in this super object. In case of multiplexing, this number may be greater than one, and if the current object has no multiplexing, this value may be set to one. In an example, for popular web applications, including website browsing and videos, the requests may be mostly single packet. Therefore, when the HTTP multiplexing happens, it may not cause much trouble for the middlebox 108 to detect the number of requests. Further, the middlebox 108 may use the number of detected requests to represent the number of HTTP pairs in the super object. In an example, in case of upstream-dominant applications, such as file upload, the uplink data stream may behave similarly to the downstream transmission of website and video services, with a lot of multiplexing. In this case, the middlebox 108 may use the number of responses to denote the number of HTTP pairs.

In an example, the length of ACK packets may contain meaningful information for packet filtering. If a packet loss is detected at the client endpoint 102 and the packet contains key information that may require re-transmission, then the client endpoint 102 may inform the server endpoint 104 with the loss information by sending an ACK packet. If the number of lost packets keeps increasing, the ACK frame may contain more information, which may result in a larger packet length. Therefore, by monitoring the ACK packet length in a real-time manner, the middlebox 108 may accurately determine the suitable threshold for the HTTP data packets, and filter out the non-date (control) frames properly. In an example, the middlebox 108 may consider the length information of the last ten ACK packets for both client-to-server and server-to-client directions. Therefore, the object-level attributes for each HTTP (super) request-response pair may include, but not limited to, the request start time, size, number of request packets; the response start time, end time, size, number of response packets; the number of HTTP pairs, and the maximum length of the last ten ACK packets in each direction.

In an example, another one of the set of attributes may include QUIC connection-level information. Once a QUIC connection has been quiet for more than $N_{timeout}$ RTTs, the connection may be considered as inactive. Then, a summary of the HTTP data transmission may be produced to form a QUIC connection-level attribute or output, and after that, all memory for this connection may be cleared. The connection-level attributes may include, nine items as shown in Table 2, where the connection start time may be the time stamp of the first packet from the client endpoint 102 to the server endpoint, the connection duration may be from the first client initial packet to the last packet detected over the QUIC connection, the request (or response) size may be the total size of all request (or response) packets in this connection, the request (or response) packet number may be the total number of all request (or response) packets, the number of individual HTTP pairs may be equal to the number of detected requests, and the number of super HTTP request-response pairs may be equal to the number of object-level attributes estimated for this QUIC connection. For example, in FIG. 4, the middlebox 108 may detect three HTTP requests (at steps 402, 404, and 406), thus the number of individual HTTP pairs may be equal to three; however, given that the response transmissions for all HTTP objects may not be separable, thus, the number of (super) HTTP objects may be equal to one. Another example in FIG. 3 may have two HTTP requests (at steps 306 and 310) and two HTTP responses (at steps 308 and 312) which may be detected without interleaving in their timeline. In this case, the number of individual HTTP pairs and the number of (super) HTTP objects both may be equal to two.

TABLE 2

| Output Type | Estimated Output |
| --- | --- |
| Object-level attributes | Request start time |
| | Response start time |
| | Response end time |
| | Request size |
| | Response size |
| | Number of packets in the request |
| | Number of packets in the response |
| | Number of HTTP request/response pairs |
| | Max length of last ten ACK packets per direction |
| Connection-level attributes | Connection start time |
| | Connection duration |
| | Total request size |
| | Total response size |
| | Total request packet number |
| | Total response packet number |
| | Number of individual HTTP request-response pairs |
| | Number of (super) HTTP objects |
| | Level of multiplexing |
| Application-level attributes | Time to first byte |
| | Time to last byte |
| | Download rate per object |

In an example, another connection-level attribute may include a level of multiplexing. The level of multiplexing may be defined as the ratio of the number of individual HTTP pairs to the number of (super) HTTP objects. The value of the multiplexing level may range in [1, $N_{request}$], where $N_{request} \in Z+$ may denote the maximum number of individual HTTP pairs that the middlebox 108 may estimate for each super object. When multiplexing happens, the level of multiplexing may be greater than one; otherwise, its value may be equal to one. The level of multiplexing may contain essential information for a network operator to classify a traffic category of the QUIC connection. For example, a web-browsing link may yield a higher multiplexing level than a video connection.

In an example, based on the estimated object-level attributes, the middlebox 108 may estimate application-level attributes to evaluate the QoE for end customers. First, the time to first byte (TTFB) may measure the duration from the client endpoint 102 making an HTTP request to the first byte of the page content being received by the client's browser. Conventionally, this duration includes DNS lookup and establishing the connection using a QUIC handshake. However, in order to evaluate the responsiveness of the HTTP server at the middlebox 108, the middlebox 108 may refer to TTFB, for each HTTP request and response pair, as the time difference between the arrival of an HTTP request and the arrival of the first packet of the corresponding response. Further, the time to last byte (TTLB) may be counted in a similar manner, as the duration between the arrival of an HTTP request and the arrival of the last response packet detected at the middlebox 108. Furthermore, the download rate per object may be estimated as the ratio of the response size over the time taken from the arrival of the first response packet to the last response packet.

In an example, the disclosed system, i.e. middlebox 108 may be implemented by way of three modules/engines including, but not limited to, a request estimation module/engine, a response estimation module/engine, and a match module/engine. In an example, the request estimation module may infer client requests, the response estimation module may consolidate the QUIC packets into individual server's responses, and the match module may pair the estimated requests with their corresponding responses, given the network-dependent constraints of inter-arrival time and RTT. Further, in an example, additional three modules/engines may be implemented at the middlebox 108 to automatically adjust the threshold for data packet size, auto-detect the MTU size, and auto-estimate the value of RTT.

Figure 5:
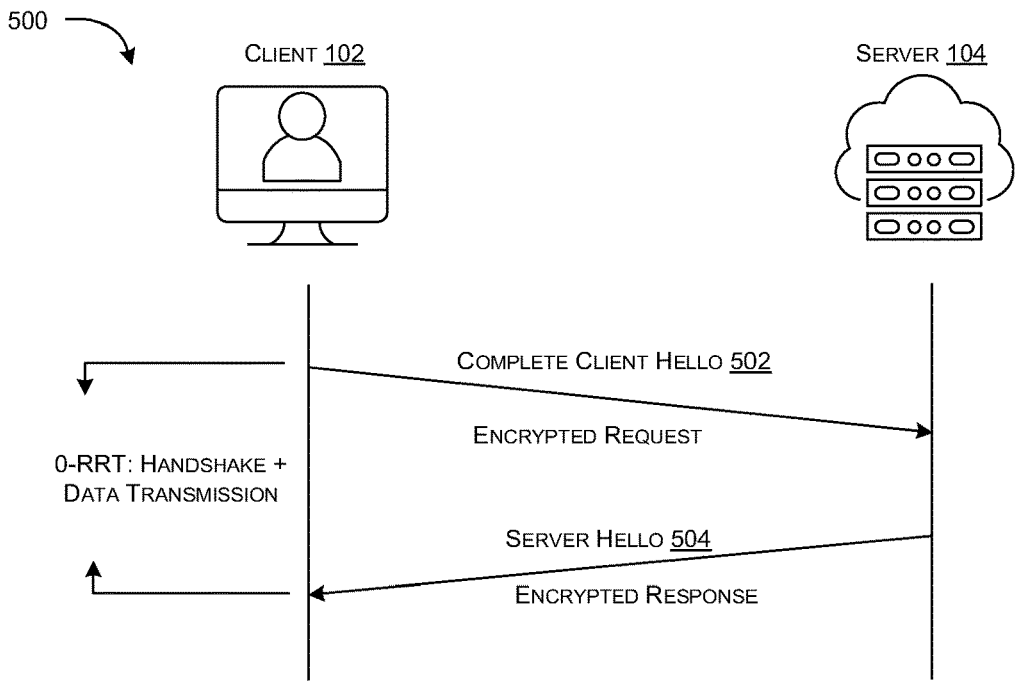
FIG. 5 illustrates an example signal flow for 0-RTT connection resumption.

FIG. 5 illustrates an example signal flow 500 for QUIC 0-RTT connection resumption.

In the QUIC protocol, a special form of HTTP request may be supported by 0-RTT connection resumption. Assume a client endpoint 102 and a server endpoint 104 had previously established a QUIC connection between each other, then when a new QUIC connection is created between the same client endpoint 102 and the server endpoint 104, QUIC may allow the client endpoint 102 to send application data in the very first roundtrip of the connection, by reusing the cached cryptographic key from the previous communications. This may allow the client endpoint 102 to compute the private encryption keys required to protect application data before even talking to the server endpoint 104, which may successfully reduce the latency penalty incurred in establishing a new connection. The updated cryptographic key for the new QUIC connection may be exchanged between the client endpoint 102 and the server endpoint 104 in the following communication stage without interrupting the HTTP request and response transmission.

Referring to FIG. 5, at step 502, along with the first packet of Initial Hello, a request may be transmitted by the client endpoint 102 immediately without waiting for any response from the server endpoint 104. Further, at step 504, a response may be transmitted by the server endpoint 104 to the client endpoint 102. Thus, in the case of 0-RTT resumption, the HTTP request and response may happen before the handshake is finished, so a special detection mechanism may be needed to infer the 0-RTT request packets.

In an example, given a QUIC packet with a long header, the third and fourth significant bits in the header may indicate the type of long-header packet. This type field may be unencrypted information and may stay available to the middlebox 108 for the current QUIC version-1 protocol. If the type field shows (0x01), then the packet is a 0-RTT packet. To determine whether this 0-RTT packet contains HTTP request data, three criteria may be assumed by the middlebox 108. First, a 0-RTT request may have a single packet. Second, the packet length of a 0-RTT request may range within [100, 1000]. Third, there may be only one QUIC packet in the UDP payload. If all above requirements are satisfied, then the 0-RTT packet may be a 0-RTT request. In another example, if the length of the QUIC packet is smaller than 100 or larger than 1000, or there are more than one QUIC packet in the UDP payload, then this 0-RTT packet may more likely contain control information, other than HTTP request data.

In an example, once handshake is finished, QUIC packets may start to use short headers, which may not have a packet-type field anymore. But, similar to 0-RTT requests, request after handshake may require only one QUIC packet in the UDP payload. Further, a request packet may have a length range between $L_{request}$ and $L_{MTU}$, where $L_{request}$ may be the length threshold for request packets, and $L_{MTU}$ may be the size of MTU. In particular, the MTU value $L_{MTU}$ may be network and device dependent. Therefore, a supporting module may be implemented at the middlebox 108 to automatically detect $L_{MTU}$ for each QUIC connection in each communication direction. In general, the MTU value $L_{MTU}$ may range within [1200, 1360]. Further, the value of $L_{request}$ may be dynamic over time within a single QUIC connection in a single communication direction. For example, when the middlebox 108 may be inferring for the first packet of the first request after handshake, the request size threshold may be set as $L_{request}=100$. Then, once the first packet of the first request has been detected, the value of $L_{request}$ may be adjusted to $L_{request}=50$. Later, as the HTTP request transmission continues, $L_{request}$ may be dynamically adjusted based on the real-time traffic conditions. Different from the 0-RTT request which may have a single packet, the HTTP request after handshake may consist of multiple packets.

Figure 6:
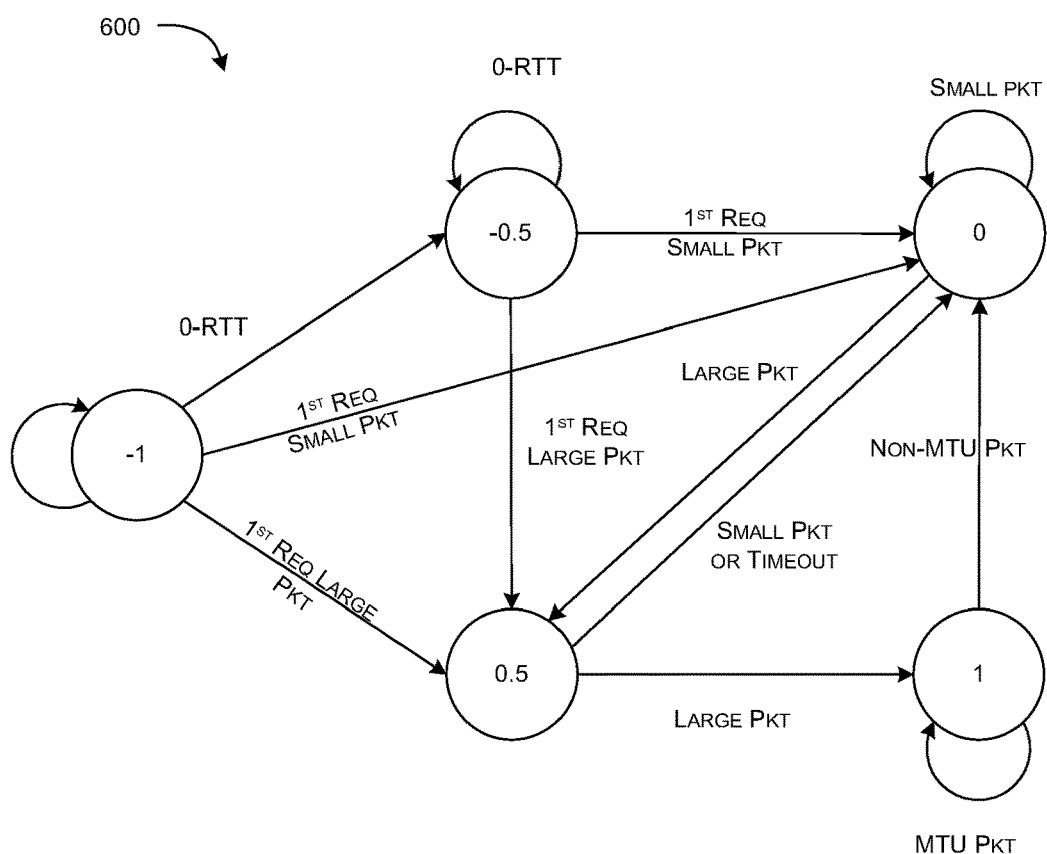
FIG. 6 illustrates an example state machine for HTTP request estimation.

FIG. 6 illustrates an example state machine 600 for HTTP request estimations.

Referring to FIG. 6, −1 may be an initial state, 0 may be an idle state, 0.5 may be a waiting state, and 1 may be a transmission state. Once the request estimation module comes to state 0.5 or 0, a request may be estimated, and the estimated request may be given to the match module to form HTTP request-response pairs. In order to disclose the communication stage, in this example, a negative value for a state may be used if the handshake is not finished at this moment, while positive values may be used for after-handshake states.

When the client endpoint 102 sends the first Initial Hello packet to the server endpoint 104, a new state machine may be initialized for the QUIC connection, and the request estimation module may have an initial state of −1. During the handshake stage, if a 0-RTT request is detected, the module may go to state −0.5. As long as the request comes to state −0.5, a 0-RTT request may be output, and the estimated 0-RTT request may be given to the match module to form HTTP request-response pairs. On the other hand, if no 0-RTT request is found, the state may stay at −1, until handshake is finished and a new request packet is detected. If the new request packet (after handshake) has a length that is equal to or slightly smaller than MTU, i.e., larger than or equal to $L_{MTU}-\Delta L$, then the request packet may be a large packet, and the module may move to state 0.5. Otherwise, if the packet length ranges in $[L_{request}, L_{MTU}-\Delta L)$, the request packet may be a small request packet, and the module may come to state 0. In an example, the value of $\Delta L$ may be a small and positive integer, such as $\Delta L=8$.

First, for state 0.5, it may be a waiting state, which means that the middlebox 108 may need to see the time and length information for the next request packet to determine whether a single-packet or multi-packet request is to be estimated. Therefore, at state 0.5, if a large packet of length larger than $L_{MTU}-\Delta L$ is received within a time period of $\Delta T_{request}$, then, the current request may be a multi-packet request, and more packets belonging to the same request may arrive soon, and in this case, the module may move to the transmission state 1. In another example, if a small packet is received with a length between $[L_{request}, L_{MTU}-\Delta L)$ within $\Delta T_{request}$, the estimated request may consist of two packets, where the first large packet may be received before state 0.5 and the second small one may be received at state 0.5. In this case, the module may go to state 0, and output the estimated two-packet request. Meanwhile, if the module is at state 0.5 for more than $\Delta T_{request}$, but no new request packet arrives, then the middlebox 108 may determine that the large packet received before state 0.5 may form a single packet request. In this case, the module may move to state 0, and output the single packet request to the match module.

Second, state 0 may be an idle state, which means at this stage there may be no on-going request. As long as the module comes from any other state to state 0, an estimated request may be output. Staying at state 0 may indicate that all existing requests may have been estimated and given to the match module to form HTTP request-response pairs, and the module may be waiting for new packets to arrive so that the new estimation may start. Under state 0, if a large request packet comes, the module may move to state 0.5 to wait for more packets. Otherwise, if a small packet arrives, the module may output a single packet request, and stay at state 0.

Lastly, state 1 may be a transmission state, which means a multi-packet request may be transmitting a sequence of MTU-sized packets. At state 1, if the newly arrived request packet has a size of MTU, then the request transmission may be still on-going, thus the module may stay at state 1. If the new request packet has a length smaller than MTU, then the transmission of the current request may be done, and the module may move to state 0, output the estimated multi-packet request, and give it to the match module.

In an example, the request estimation module may monitor all the QUIC packets from the client endpoint 102 to the server endpoint 104 on a given QUIC connection, process the header, time, length, and order information of each encrypted packet, and output the estimated request to the match module.

Figure 7:
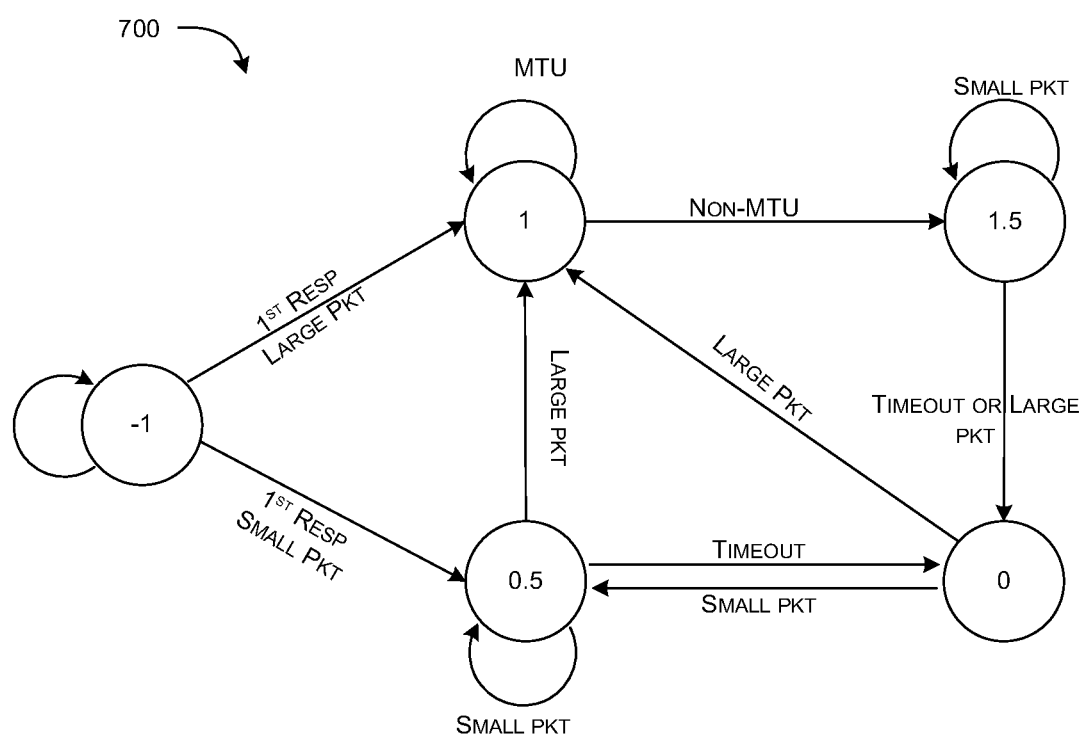
FIG. 7 illustrates an example state machine for HTTP response estimation.

FIG. 7 illustrates an example state machine 700 for HTTP response estimation.

Referring to FIG. 7, −1 may be an initial state, 0 may be an idle state, 0.5 may be waiting-to-start state, 1 may be a transmission state, and 1.5 may be waiting-to-end state. Once the response estimation module comes to state 0, a response may be estimated and given to the match module.

Similar to the request packet, an HTTP response may have only one QUIC packet in the UDP payload, and the length of a response packet may range between $[L_{response}, L_{MTU}]$. In an example, the MTU size for request and response on the same QUIC connection, in most cases, may be of the same value, but may be different. Moreover, similar to the request estimation, the length threshold of the response data packet $L_{response}$ may be dynamic. The initial value of $L_{response}$ at the beginning of the QUIC connection may be set to be a fixed value, for example $L_{response}=35$. Later, as the HTTP response transmission continues, $L_{response}$ may be dynamically adjusted based on the real-time traffic conditions. Therefore, after the middlebox 108 has detected at least one request, then if a QUIC packet from the server endpoint 104 to the client endpoint 102 has only one QUIC in the UDP payload, with a length between $L_{response}$ and $L_{MTU}$, then this packet may be classified as an HTTP response packet.

In an example, most of HTTP responses may consist of more than one packet. Therefore, in the response estimation, the middlebox 108 may need to detect the start and the end of each multi-packet response carefully. As a result, two waiting states may be introduced in the response state machine, which may be waiting-to-start and waiting-to-end states, respectively, as shown in FIG. 7. Initially, when no request is found over a QUIC connection, the response estimation module may stay at the state −1. When the match module receives at least one request and a new response packet is detected, the module may move from state −1 to state 0.5 if the response packet has a length between $[L_{response}, L_{MTU}-\Delta L)$, or the module may move to state 1 if the packet size is larger than or equal to $L_{MTU}-\Delta L$.

First, state 0.5 may be a waiting-to-start state, which means after receiving a small packet, the middlebox 108 may need to wait for the next response packet to determine the transmission pattern. Therefore, at state 0.5, if a large packet arrives within $\Delta T_{response}$, the middlebox 108 may consider the current response as a multi-packet response, thus the module may move to state 1. On the other hand, if the new packet received at state 0.5 is a small packet, i.e., QUIC packet length within $[L_{response}, L_{MTU}-\Delta L)$, then, the middlebox 108, i.e. the response estimation module may group the small packets received before and at state 0.5 together into one response. Further, if no new response packet arrives within $\Delta T_{response}$, then the estimation for the current response may be finished. In this case, the module may move to state 0, and output a response consisting of one or several small response packets, received before and at state 0.5.

Second, state 0 may be an idle state, which means at the current stage there may be no transmitting response. As long as the module comes to state 0, an estimated response may be output, and this response may be given to the match module to form HTTP request-response pairs. Staying at state 0 may indicate that all exiting responses have been detected and passed to the match module, and the module may be waiting for new packets to arrive and start new estimations. In this case, if a large response packet comes, the module may move to state 1. Otherwise, if a small packet arrives, the module may come to state 0.5.

Next, state 1 may be a transmission state, which means a multi-packet response may be transmitting a sequence of MTU-sized packets. At state 1, if the newly-arrived response packet has a size of MTU, then the response transmission may continue and the module may stay at state 1. Otherwise, the multi-packet transmission may be going to end, and the module may move to state 1.5.

Lastly, state 1.5 may be a waiting-to-end state. This state may cope with the situation where a response may end with more than one small packet. In an example, a standard packet sequence of a response may end with one packet with a length smaller than MTU. However, if some response packets may be missing during their transmission and re-transmission of these packets happens, then an HTTP response may end with multiple small packets. Therefore, the middlebox 108 may include all response packets having the same stream ID to form the ground-truth response. Consequently, at state 1, if the middlebox 108 observes a small packet with length between [$L_{response}$, $L_{MTU}$-$\Delta L$), it may be hard to determine whether the response transmission is finished, or there may be more small packets to come. Therefore, the module may wait at state 1.5 for one $\Delta T_{response}$. During the waiting period, if more small packets arrive, the module may consolidate these small packets with the previous MTU sequence to form one response, and the module may stay at the state 1.5 until timeout. If, during the waiting time at state 1.5, no packet arrives, the middlebox 108 may determine that the response transmission is finished, thus, the module may go to state 0, and output the estimated response. However, if a large response packet arrives within $\Delta T_{response}$, the middlebox 108 may determine that the previous response has finished and a large packet belonging to a new response is received. In this case, the module may first go to state 0, output a response consisting of all previous packets but not including the last one, and then, the newly arrived large packet may start another response estimation, and the module may move to state 1.

In an example, the response estimation module may monitor all the QUIC packets from the server endpoint 104 to the client endpoint 102 on a given QUIC connection, process the header, time, length, and order information of each encrypted packet, and output the estimated response to the match module.

Figure 8:
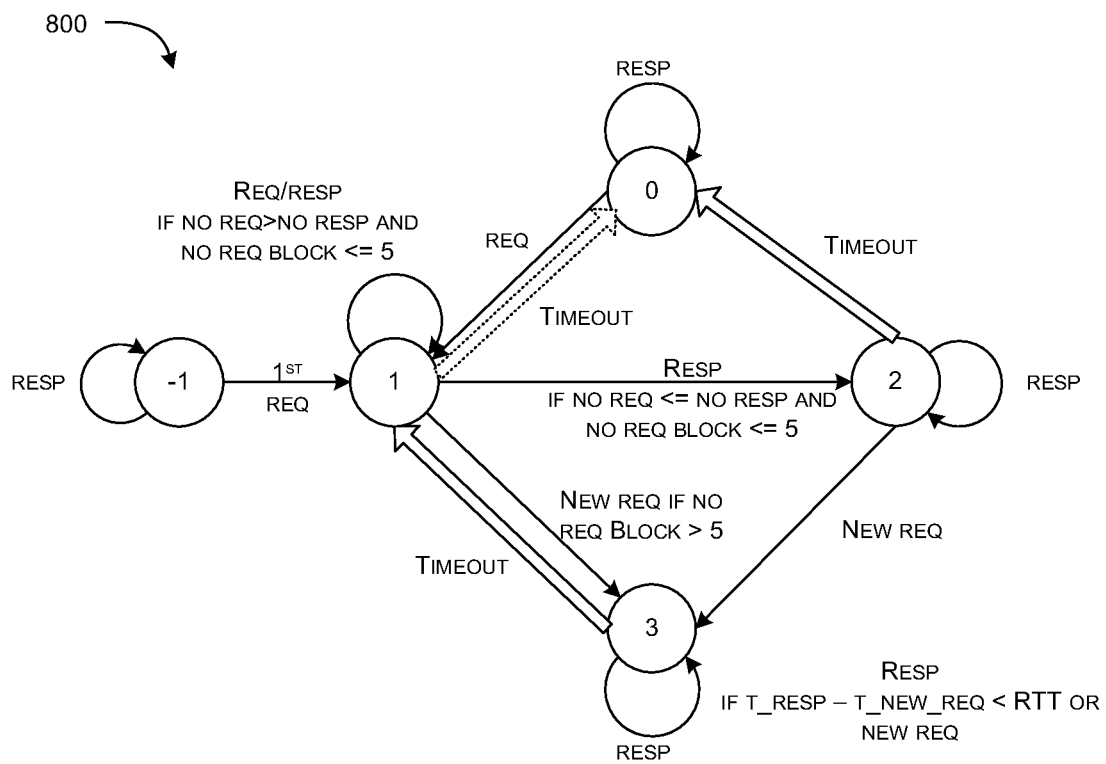
FIG. 8 illustrates an example state machine for HTTP request-response match module.

FIG. 8 illustrates an example state machine 800 for HTTP request-response match module.

Referring to FIG. 8, -1 may be an initial state, 0 may be an idle state, 1 may be waiting-for-response state, 2 may be waiting-for-new-request state, and 3 may be waiting-to-output state. Once the match module may move over a double-line arrow, an HTTP request-response pair may be estimated, where the dash-line arrow may require certain conditions for an HTTP output, while the solid-line may give an output without condition.

Given the estimated HTTP requests and responses, the final step may be to match the associated requests and responses to form HTTP pairs, also referred as HTTP objects. As described previously, the QUIC protocol supports HTTP multiplexing, where within one QUIC connection, multiple requests or responses may be transmitted at similar timestamps over different streams. In an example, the request estimation module may provide an accurate estimation on the number of requests over the encrypted QUIC connection, therefore, the middlebox 108 may identify how many individual HTTP objects may be there in a super HTTP object, based on the estimated request number. Referring to FIG. 8, the input of the match module may be the estimated HTTP requests and responses, while the output may be the object-level HTTP information. Initially, before the match module receives any request, all response input may be ignored, and the match module may stay at the initial state -1.

After the match module receives the first request, the module may come to state 1. The definition for state 1 may be that the number of requests is greater than the number of responses, and the number of requests is no larger than a threshold $N_{request} \in Z+$. Here, $N_{request}$ may denote the maximum level of multiplexed HTTP objects that the module may take, which may also be the maximum number of individual HTTP objects in each super object. In the example of FIG. 8, $N_{request}=5$, which means that the module may allow up to five individual request-response pairs to be grouped into one super HTTP object. Staying at state 1 means that some HTTP requests may have been sent from the client endpoint 102 to the server endpoint 104, but not all of their responses may have been received, therefore the module may need to wait for more responses to arrive to finish the request-response match. At state 1, if more requests or responses arrive, the match module may still stay at state 1, as long as the number of requests is greater than the number of responses, and the number of requests is less than or equal to $N_{request}$. However, if the match module does not receive any more requests or responses for more than $N_{timeout}$ RTTs, then the match module may timeout, and the module may move to state 0. At this moment, if the number of responses is greater than zero, then an HTTP object may be output, combining all existing requests and responses information. However, if the number of responses is zero, then there may be no matched request-response pair, thus the module may go to state 0 without any output. In FIG. 8, the dash-line from state 1 to state 0 may indicate that this move has a conditional output only when the numbers of requests and response are both non-zero.

Back to state 1, if the match module receives more responses, and the number of requests becomes less than or equal to the number of responses, but the number of requests is still no larger than $N_{request}$, the match module may move to state 2. State 2 may mean that the match module has received at least equal numbers of requests and responses, which may be enough for one-to-one request-response match. However, at state 2, no output may be given. Instead, the match module at state 2 may wait for either more response, or timeout, or a new request. If new responses arrive during state 2 within one $\Delta T_{response}$, their information may be added into the current HTTP object, and the module may stay at the current state. If no new request or response arrives within one $\Delta T_{response}$, the current match module may timeout, and the module may move to state 0, and output an HTTP object combining all the received requests and responses of the current HTTP pair.

In an example, when the module stays at state 2 and a new request comes, the module may move to another waiting state 3 without an output. The information of the new request may be processed separately from the previous requests and responses, and its information be hold into a new HTTP object. The purpose of state 3 may be to make sure in the following one RTT, no further response arrives, before the current HTTP estimation may be output. Therefore, the match module may stay at state 3 for one RTT. During this time period, if a new response arrives, then the time difference between this response with the new request may be less than one RTT, therefore this response may be associated with the previous requests that may be received before state 2. Meanwhile, during the one-RTT period at state 3, if more new requests arrive, these requests may be held into the new HTTP object, and the module may stay at state 3 until one-RTT timer expires. After one RTT past, an estimated HTTP object may be output combining the previous requests received before state 2 and all received responses, and then the match module may move to state 1. In an example, all newly received requests at both state 2 and state 3 may be associated with a new HTTP object, and the purpose of state 3 may be to make sure that the time difference between a request and its associated response may be at least one RTT.

Lastly, state 0 may be the idle state, in which the QUIC connection has been quite for more than $N_{timeout}$ RTTs. At state 0, all newly arrived responses may be discarded, and if a request is received, the match module may move to state 1. In summary, referring to FIG. 8, the match module may take all estimated requests and responses as input, and generate the matched HTTP request-response pairs as output.

In an example, as described previously, the middlebox 108 may implement additional supporting modules to enable an automatic adjustment of key parameters. The supporting modules may enable the auto-adjustment of length threshold for QUIC data packets, auto-detection of MTU size, and auto-estimation of RTT, respectively. In an example, for both length threshold and MTU size modules, the estimation may give the real-time values for both upstream and downstream separately over each QUIC connection.

In an example, an initial value for the request length threshold may be set to $L_{request}=50$. That is, if a QUIC packet from the client endpoint 102 to the server endpoint 104 has a length larger than or equal to 50 bytes, then it may be considered as an HTTP request packet; otherwise, it may be considered as a non-data (control) packet. For a small-sized non-data (control) packet, it may contain different kinds of control information, while one of the most common types for control packets is ACK. Usually, a control frame may have a fixed or typical length, which may be easily detected and filtered out. However, the length of ACK packets may change with the real-time network condition, i.e., given a congested downlink condition, the ACK packet from the client endpoint 102 to the server endpoint 104 may have a larger length. The disclosed system may actively track the size of the latest few ACK packets, and adjust the size threshold for request data packets accordingly.

In an example, the initial threshold $L_{request}=50$ may provide a suitable guideline to separate non-data (control) packets from request packets, if there is no packet loss in the HTTP response (i.e., downlink). However, if the downstream from the server endpoint 104 to the client endpoint 102 starts to lose packets, the client endpoint 102 may need to inform the server endpoint 104 with the packet missing information in the ACK packet. As the number of lost response packets increases, the ACK packet size from the client endpoint 102 to the server endpoint 104 may become larger, as more information may need to be given back to the server endpoint 104. Once the ACK size comes to around 50 bytes, the initial $L_{request}$ may no longer separate ACK packets and request data. In order to address the issue of increased ACK size in face of packet loss, the real-time length of the ACK packets may need to be monitored, for which an auto-adjustment of request size threshold may be required as explained herein.

At the beginning, the initial threshold $L_{request}=50$ may be used to separate small-size ACK packets from the large-sized request packets. Once M small-size packets are found, the maximum length of these M packets may be taken as $I^{max}_{ack}=\max\{I^1_{ack}, I^2_{ack}, \ldots, I^M_{ack}\}$, and the request threshold may be adjusted by $L_{request}=I^{max}_{ack}+\Delta I$, where a suitable value for M and $\Delta I$ may be $M=10$ and $\Delta I=10$, respectively. In the following communication, the value of the maximum length of the latest M non-data (control) packets $I^{max}_{ack}$ for every detected non-data (control) packet may be checked, and the request threshold may be updated by $L_{request}=I^{max}_{ack}+\Delta I$.

In an example, the threshold adjusting modules for response packets may be designed in a similar way, where the initial threshold may be $L_{response}=35$; after M small-sized packets may have been detected from the server endpoint 104 to the client endpoint 102, the adjusting module may start to update the response threshold by the maximum length of the latest M non-data (control) packets, plus $\Delta I$.

In an example, the MTU size of both QUIC and UDP packets may depend on the network setting, server implementation, and client device types. Therefore, MTU may take different values for different QUIC connections, or even over the same QUIC connection but in different communication directions. At the beginning, the initial MTU-value for QUIC packets in both client-to-server and server-to-client directions may be set to $L_{MTU}=1200$. Then, for each request packet, the client-to-server MTU value may be updated by taking the maximum out of the length of the new packet and the current value of the client-to-server MTU. A similar update may be applied to the server-to-client MTU for each response packet.

In an example, as shown both in FIG. 3 and FIG. 5, the QUIC handshake stage may requires the client endpoint 102 to start with a Client Hello packet, and then, the server endpoint 104 may reply with a Server Hello. This roundtrip pattern during the handshake may provide an estimation on the RTT. Especially when the QUIC connection may be established without previous memory, handshake stage may involve more than one roundtrip, then the value of RTT may be calculated by averaging the time spent over these roundtrips during handshake.

Figure 9:
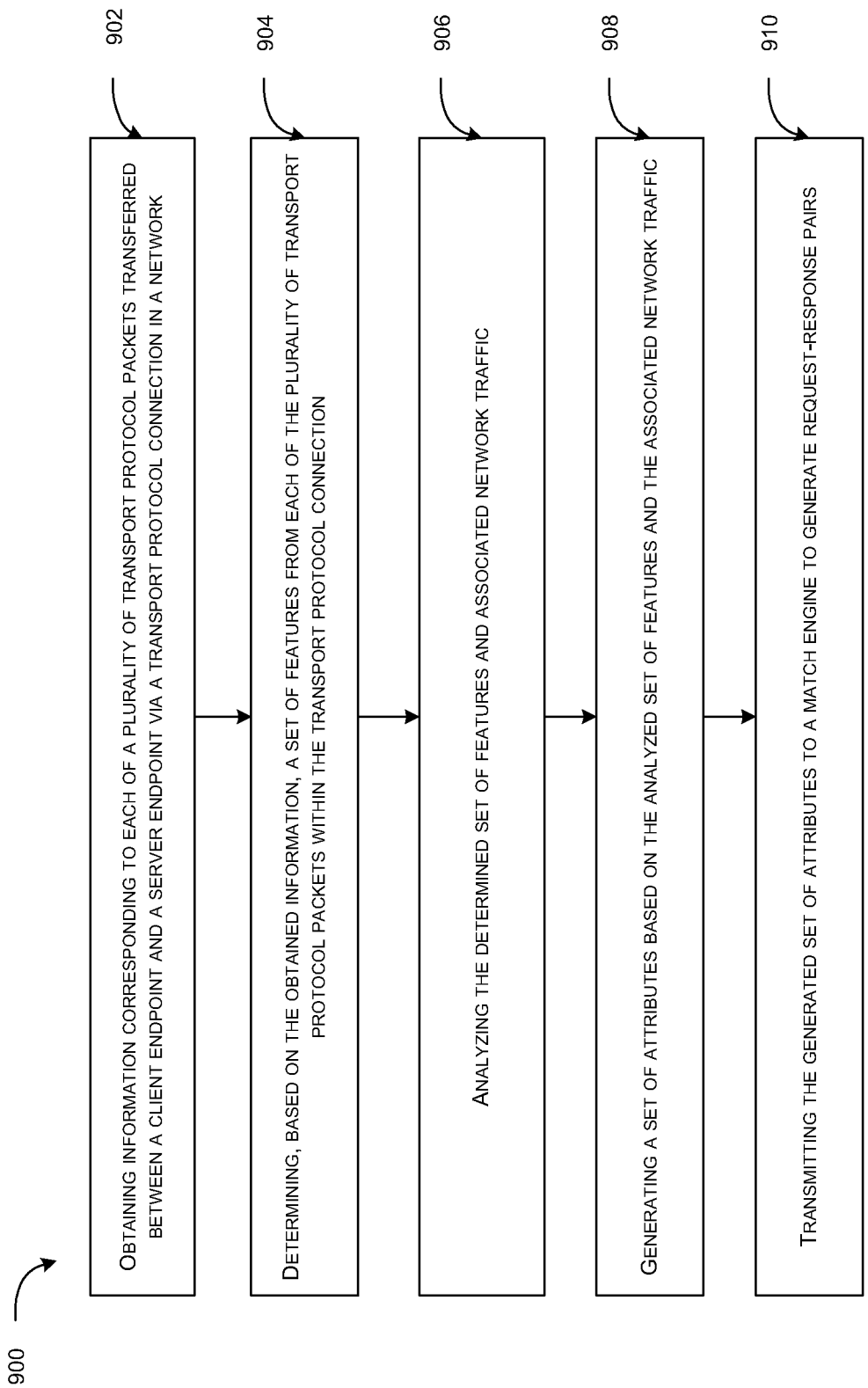
FIG. 9 illustrates an example flow chart of a method for application-layer characterization of a transport protocol connection.

FIG. 9 illustrates an example flow chart of a method 900 for estimating application-layer characterization.

Referring to FIG. 9, at step 902, the method 900 may include obtaining, by a system, i.e. a middlebox 108 or a processor implemented at the system, information corresponding to each of a plurality of transport protocol packets transferred between a client endpoint 102 and a server endpoint 104 via a transport protocol connection in a network. In an example, the plurality of transport protocol packets may include requests transferred from the client endpoint 102 to the server endpoint 104 and responses transferred from the server endpoint 104 to the client endpoint 102. As described herein, the transport protocol connection may be a QUIC connection between the client endpoint 102 and the server endpoint 104. In an example, the plurality of transport protocol packets may include HTTP packets. In an example, the information may include, but not be limited to, source IP, destination IP, source port, destination port, and QUIC connection ID.

At step 904, the method 900 may include determining, based on the obtained information, a set of features from each of the plurality of transport protocol packets within the transport protocol connection. In an example, the set of features may include, but not be limited to, a header type, a packet length, a packet arrival time, and a packet order and position. In an example, the header type may include one of a long header or a short header. In an example, the header type may provide information on completion of handshake between the client endpoint 102 and the server endpoint 104.

Referring to FIG. 9, at step 906, the method 900 may include analyzing the determined set of features and associated network traffic. In an example, the method 900 may include associating the requests with corresponding responses to generate request-response pairs. In an example, the method 900 may include identifying requests transferred from the client endpoint 102 to the server endpoint 104 in the transport protocol connection. Further, the method 900 may include estimating the responses transferred from the server endpoint 104 to the client endpoint 102 in the transport protocol connection. Furthermore, the method 900 may include matching each request with the corresponding response to generate the request-response pairs. In an example, the disclosed system may match each request with the corresponding response based on network-dependent constraints of inter-arrival time and RTT.

In an example, the method 900 may include detecting multiplexing of the requests by the client endpoint 102 and the responses by the server endpoint 104. In such a scenario, the method 900 may include matching a number of the requests and a number of the responses as a group to generate a super request-response pair.

In an example, the method 900 may include identifying control messages and data messages from the plurality of encrypted transport protocol packets and filtering the control messages from the plurality of encrypted transport protocol packets based on a dynamic threshold of the packet length. In an example, the method 900 may include comparing the packet length of each encrypted transport protocol packet with the dynamic threshold. In response to a determination that the packet length of an encrypted transport protocol packet is less than the dynamic threshold, the method 900 may include determining that the encrypted transport protocol packet includes control message. In response to a determination that the packet length of the encrypted transport protocol packet is greater than the dynamic threshold, the method 900 may include determining that the encrypted transport protocol packet includes data message.

In an example, the method 900 may include determining an inter-arrival time based on a difference between the packet arrival time of two sequential response or request packets in the transport protocol connection, and determining whether the two sequential response or request packets belong to a same response or request message based on a comparison of the inter-arrival time with a threshold of the inter-arrival time. In response to a determination that the inter-arrival time of the two sequential response or request packets is less than the threshold, the method 900 may include determining that the two sequential response or request packets are associated with the same response or request message. In response to a determination that the inter-arrival time of the two sequential response or request packets is greater than the threshold, the method 900 may include determining that the two sequential response or request packets are associated with different response or request messages.

Referring to FIG. 9, at step 908, the method 900 may include generating a set of attributes based on the analyzed set of features and the associated network traffic. In an example, the set of attributes may include object-level attributes, connection-level attributes, and application-level attributes. Further, at step 910, the method 900 may include transmitting the set of attributes to a match engine, as discussed herein, to generate request-response pairs.

It may be appreciated that the steps shown in FIG. 9 are merely illustrative. Other suitable steps may be used to estimate the set of attributes, if desired. Moreover, the steps of the method 900 may be performed in any order and may include additional steps.

Figure 10:
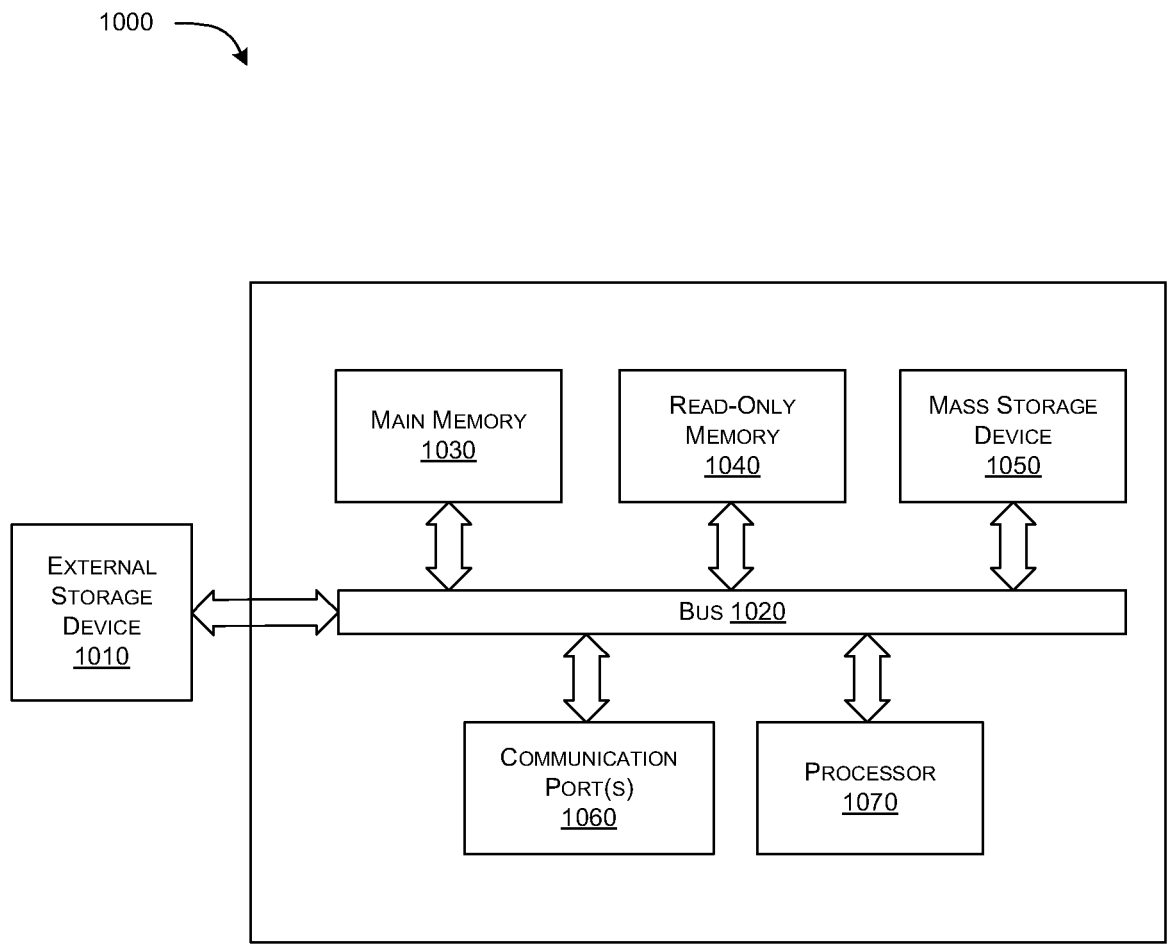
FIG. 10 illustrates an exemplary computer system in which or with which examples of the present disclosure may be implemented.

FIG. 10 illustrates an exemplary computer system 1000 in which or with which examples of the present disclosure may be implemented. In some examples, the middlebox 108 of FIG. 1 may be implemented as the computer system 1000.

As shown in FIG. 10, the computer system 1000 may include an external storage device 1010, a bus 1020, a main memory 1030, a read-only memory 1040, a mass storage device 1050, communication port(s) 1060, and a processor 1070. A person skilled in the art will appreciate that the computer system 1000 may include more than one processor and communication ports. The processor 1070 may include various modules associated with examples of the present disclosure. The communication port(s) 1060 may be chosen depending on a network, such as a Local Area Network (LAN), Wide Area Network (WAN), or any network to which the computer system 1000 connects. The main memory 1030 may be Random-Access Memory (RAM), or any other dynamic storage device commonly known in the art. The read-only memory 1040 may be any static storage device(s) e.g., but not limited to, a Programmable Read Only Memory (PROM) chips for storing static information e.g., start-up or basic input/output system (BIOS) instructions for the processor 1070. The mass storage device 1050 may be any current or future mass storage solution, which can be used to store information and/or instructions.

The bus 1020 communicatively couples the processor 1070 with the other memory, storage, and communication blocks. Optionally, operator and administrative interfaces, e.g. a display, keyboard, joystick, and a cursor control device, may also be coupled to the bus 1020 to support direct operator interaction with the computer system 1000. Other operator and administrative interfaces may be provided through network connections connected through communication port(s) 1060. The external storage device 1010 may be any kind of external hard-drives, floppy drives, or the like. Components described above are meant only to exemplify various possibilities. In no way should the aforementioned exemplary computer system 1000 limit the scope of the present disclosure.

The methods described herein may be performed using the systems described herein. In addition, it is contemplated that the methods described herein may be performed using systems different than the systems described herein. Moreover, the systems described herein may perform the methods described herein and may perform or execute instructions stored in a non-transitory computer-readable storage medium (CRSM). The CRSM may comprise any electronic, magnetic, optical, or other physical storage device that stores executable instructions. The instructions may comprise instructions to cause a processor to perform or control performance of operations of the proposed methods. It is also contemplated that the systems described herein may perform functions or execute instructions other than those described in relation to the methods and CRSMs described herein.

Furthermore, the CRSMs described herein may store instructions corresponding to the methods described herein, and may store instructions which may be performed or executed by the systems described herein. Furthermore, it is contemplated that the CRSMs described herein may store instructions different than those corresponding to the methods described herein, and may store instructions which may be performed by systems other than the systems described herein.

The methods, systems, and CRSMs described herein may include the features or perform the functions described herein in association with any one or more of the other methods, systems, and CRSMs described herein.

In some examples the method or methods described above may be executed or carried out by a computing system (for example, the computer system 1000 of FIG. 10) including a tangible computer-readable storage medium, also described herein as a storage machine, that holds machine-readable instructions executable by a logic machine (i.e. a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI) or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard or gaming controller. For example, a user input may indicate a request that certain task is to be executed by the computing system, such as requesting the computing system to display any of the above described information, or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

The invention claimed is:

1. A system, comprising:
   a processor; and
   a memory operatively coupled with the processor, wherein the memory comprises processor-executable instructions which, when executed by the processor, cause the processor to:
   obtain information corresponding to each of a plurality of encrypted transport protocol packets transferred between a client endpoint and a server endpoint via a transport protocol connection in a network, wherein the plurality of encrypted transport protocol packets comprises requests transferred from the client endpoint to the server endpoint and responses transferred from the server endpoint to the client endpoint;
   determine, based on the obtained information, a set of features from each of the plurality of encrypted transport protocol packets within the transport protocol connection, wherein the set of features comprises at least one of a header type, a packet length, a packet arrival time, and a packet order and position;
   analyze the determined set of features and associated network traffic;
   generate a set of attributes based on the analyzed set of features and the associated network traffic, wherein the set of attributes comprises object-level attributes, connection-level attributes, and application-level attributes; and
   transmit the generated set of attributes to a match engine to generate request-response pairs.

2. The system of claim 1, wherein the processor is to analyze the determined set of features by associating the requests with corresponding responses.

3. The system of claim 2, wherein the processor is to associate the requests with the corresponding responses by:
   identifying the requests transferred from the client endpoint to the server endpoint in the transport protocol connection;
   estimating the responses transferred from the server endpoint to the client endpoint in the transport protocol connection; and
   matching, via the match engine, each request with the corresponding response to generate the request-response pairs.

4. The system of claim 3, wherein the processor is to match each request with the corresponding response based on network-dependent constraints of inter-arrival time and round trip time.

5. The system of claim 2, wherein the processor is to detect multiplexing of the requests by the client endpoint and the responses by the server endpoint, and wherein the processor is to associate the requests with the corresponding responses by matching, via the match engine, a number of the requests and a number of the responses as a group to generate a super request-response pair.

6. The system of claim 1, wherein the processor is to analyze the determined set of features by:
   identifying control messages and data messages from the plurality of encrypted transport protocol packets; and
   filtering the control messages from the plurality of encrypted transport protocol packets based on a dynamic threshold of the packet length.

7. The system of claim 6, wherein the processor is to filter the control messages from the plurality of encrypted transport protocol packets by:
   comparing the packet length of each encrypted transport protocol packet with the dynamic threshold;
   in response to a determination that the packet length of an encrypted transport protocol packet is less than the dynamic threshold, determining that the encrypted transport protocol packet comprises control message; and in response to a determination that the packet length of the encrypted transport protocol packet is greater than or equal to the dynamic threshold, determining that the encrypted transport protocol packet comprises data message.

8. The system of claim 1, wherein the processor is to analyze the determined set of features by:
   determining an inter-arrival time based on a difference between the packet arrival time of two sequential response or request packets in the transport protocol connection;
   determining whether the two sequential response or request packets belong to a same response or request message based on a comparison of the inter-arrival time with a threshold of the inter-arrival time;
   in response to a determination that the inter-arrival time of the two sequential response or request packets is less than or equal to the threshold, determining that the two sequential response or request packets are associated with the same response or request message; and
   in response to a determination that the inter-arrival time of the two sequential response or request packets is greater than the threshold, determining that the two sequential response or request packets are associated with different response or request messages.

9. The system of claim 1, wherein the object-level attributes comprise at least one of a start time, a size, and a number of request packets in a request message, and a start time, an end time, a size, a number of response packets in a response message, a number of individual request-response pairs in an estimated object, and the maximum length of last ten non-data packets in each direction.

10. The system of claim 1, wherein the connection-level attributes comprise at least one of a connection start time, a connection duration, a total request size, a total response size, a total request packet number, a total response packet number, a number of request-response pairs, a number of super request-response pairs, and a level of multiplexing.

11. The system of claim 1, wherein the application-level attributes comprise at least one of a time to first byte, a time to last byte, and a download rate per request-response pair.

12. The system of claim 5, wherein in case of multiplexing of the requests and the responses, the object-level attributes for each super request-response pair comprise at least one of a request or response start time as a time stamp of a first request or response packet in the super request-response pair, a response end time as a time stamp of a last response packet, a request or response size as a total size of all request or response packets in the super request-response pair, a request or response packet number as a total number of all request or response packets in the super request-response pair, and a number of individual request-response pairs in an estimated super object.

13. The system of claim 1, wherein the transport protocol connection is a Quick User Datagram Protocol (UDP) Internet Connection (QUIC) between the client endpoint and the server endpoint, and wherein the plurality of encrypted transport protocol packets comprises hypertext transfer protocol (HTTP) packets.

14. The system of claim 2, wherein the processor is to generate the request-response pairs for each of online estimation and offline estimation.

15. The system of claim 1, wherein the processor is to automatically determine maximum transfer size and round-trip time for the associated network traffic to generate the set of attributes.

16. The system of claim 1, wherein the processor is to generate the set of attributes for one or more applications comprising at least one of video traffic, interactive web traffic, and bulk file upload and downlink traffic.

17. A computer-implemented method, comprising:
   obtaining, by a processor, information corresponding to each of a plurality of encrypted transport protocol packets transferred between a client endpoint and a server endpoint via a transport protocol connection in a network, wherein the plurality of encrypted transport protocol packets comprises requests transferred from the client endpoint to the server endpoint and responses transferred from the server endpoint to the client endpoint;
   determining, by the processor, based on the obtained information, a set of features from each of the plurality of encrypted transport protocol packets within the transport protocol connection, wherein the set of features comprises at least one of a header type, a packet length, a packet arrival time, and a packet order and position;
   analyzing, by the processor, the determined set of features and associated network traffic;
   generating, by the processor, a set of attributes based on the analyzed set of features and the associated network traffic, wherein the set of attributes comprises object-level attributes, connection-level attributes, and application-level attributes; and
   transmitting, by the processor, the set of attributes to a match engine to generate request-response pairs.

18. The method of claim 17, wherein analyzing, by the processor, the determined set of features comprises associating, by the processor, the requests with corresponding responses.

19. The method of claim 18, wherein associating, by the processor, the requests with the corresponding responses comprises:
   identifying, by the processor, the requests transferred from the client endpoint to the server endpoint in the transport protocol connection;
   estimating, by the processor, the responses transferred from the server endpoint to the client endpoint in the transport protocol connection; and
   matching, by the processor via the match engine, each request with the corresponding response to generate the request-response pairs.

20. A non-transitory computer-readable medium comprising processor-executable instructions that cause a processor to:
   obtain information corresponding to each of a plurality of encrypted transport protocol packets transferred between a client endpoint and a server endpoint via a transport protocol connection in a network, wherein the plurality of encrypted transport protocol packets comprises requests transferred from the client endpoint to the server endpoint and responses transferred from the server endpoint to the client endpoint;
   determine, based on the obtained information, a set of features from each of the plurality of encrypted transport protocol packets within the transport protocol connection, wherein the set of features comprises at least one of a header type, a packet length, a packet arrival time, and a packet order and position;
   analyze the determined set of features and associated network traffic;
   generate a set of attributes based on the analyzed set of features and the associated network traffic, wherein the set of attributes comprises object-level attributes, connection-level attributes, and application-level attributes; and transmit the generated set of attributes to a match engine to generate request-response pairs.

\* \* \* \* \*